United States Patent [19]

Fennema et al.

[11] Patent Number: 5,136,569

[45] Date of Patent: Aug. 4, 1992

[54] OPTICAL DISK RECORDER FOR DIVERSE MEDIA TYPES AND HAVING A PREDETERMINED INITIALIZATION OR START-UP PROCEDURE

[75] Inventors: Alan A. Fennema; Blair I. Finkelstein; Morovat Tayefeh; Raymond Yardy, all of Tucson, Ariz.

[73] Assignee: International Business Machines Corporation, Armonk, N.Y.

[21] Appl. No.: 589,712

[22] Filed: Sep. 28, 1990

[51] Int. Cl.[5] .............................................. G11B 7/125
[52] U.S. Cl. ..................................... 369/58; 369/116; 369/44.27; 369/54; 369/53
[58] Field of Search ................ 369/34, 36, 44.12, 217, 369/53, 50, 54, 116, 58, 57, 59, 32, 44.27, 44.26, 44.28, 44.29, 44.31, 112, 106; 250/201.2, 201.5

[56] References Cited

U.S. PATENT DOCUMENTS

| | | | |
|---|---|---|---|
| 4,631,713 | 12/1986 | Romeas et al. | 369/54 |
| 4,811,194 | 3/1989 | Tominaga | 369/116 |
| 4,843,604 | 6/1989 | Fujiwara et al. | 369/116 |
| 4,939,717 | 7/1990 | Ohno et al. | 369/116 |
| 4,989,195 | 1/1991 | Suzuki | 369/50 |

Primary Examiner—Robert L. Richardson
Assistant Examiner—Muhammad N. Edun
Attorney, Agent, or Firm—H. F. Somermeyer

[57] ABSTRACT

An optical disk recorder is capable of operating with diverse types of optical media. A device initialization procedure is repeated for each receipt of each optical medium. Such procedure includes moving an objective lens to an extreme radial position, defocussing the lens at a most remote position, then calibrating the laser circuits to ensure that the emission of radiation from the laser will not inadvertently destroy signals recorded on the just received medium. Then the medium type is read from the medium and based upon the type indication, various additional calibrating procedures are followed and different sources of laser control values are used for signal exchanging operations between the recorder and received optical medium.

13 Claims, 3 Drawing Sheets

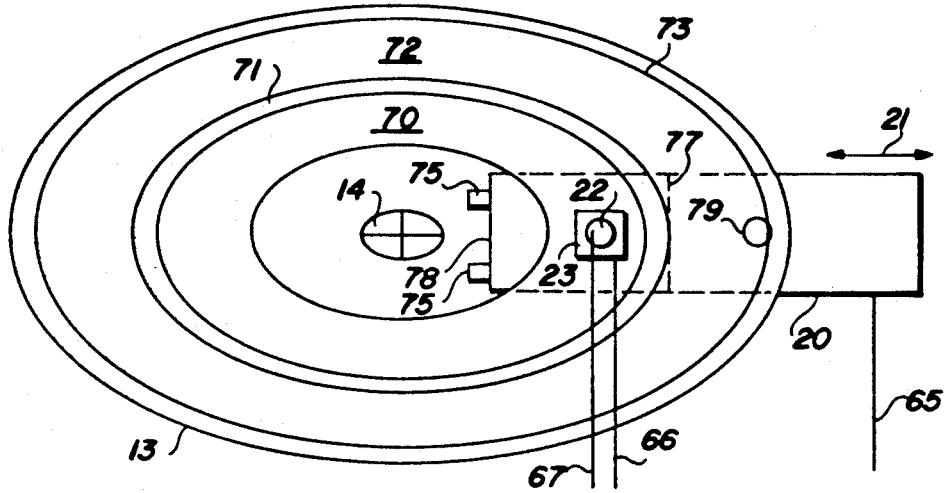
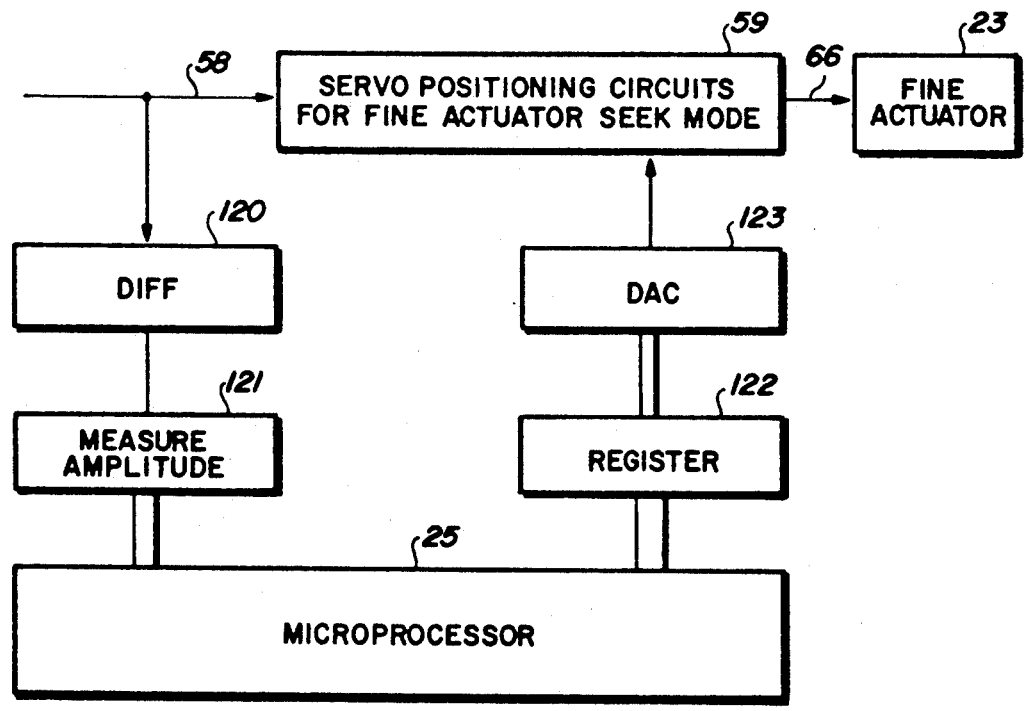

OPTICAL DISK RECORDER FOR DIVERSE MEDIA TYPES AND HAVING A PREDETERMINED INITIALIZATION OR START-UP PROCEDURE

DOCUMENT INCORPORATED BY REFERENCE

Fennema U.S. Pat. No. 4,839,876 is incorporated by reference for showing an optical path for carrying optical signals to and from an optical disk in an optical device.

FIELD OF THE INVENTION

The present invention relates to optical recording and readback using diverse types of optical media, particularly to start-up procedures for use with optical recorder and playback devices.

BACKGROUND OF THE INVENTION

Optical recorders and players employ semiconductor laser devices for supplying a beam of radiation for effecting recording and readback operations. Such semiconductor lasers emit two beams of radiation, a so-called front beam which is used for the recording and reading and a back beam which is much lower intensity but indicates the intensity of the front beam. The intensity of the front beam can be controlled through a circuitry connected to the back beam using a so-called auxiliary photodiode, servo circuits, etc. Such circuits are also useful for detecting excessive intensity of the front beam. Such excessive intensity during a read operation could unintentionally partially or completely erase information recorded on an optical disk. While such overpower protection circuits are necessary, degradation of the laser servo power control loop or the auxiliary photodiode sensing capability can falsely indicate an intensity of the beam of radiation, i.e., indicate the beam of radiation has less intensity than it actually has. Such degradation, of course, can be caused by changes in the circuit, soldered connections, dust on the diode lens, etc. It is therefore desired to verify successful operation of the laser diode before an emitted beam of radiation can unintentionally change or erase data recorded on an optical medium. A particular initialization or start-up procedure for an optical recorder/player is provided by the present invention which ensures against such unintended erasure which is caused by circumstances detectable at disk spin time start-up of a recorder or player.

DISCUSSION OF KNOWN PRIOR ART

Romeas, U.S. Pat. No. 4,631,713 shows calibration of a laser diode to a storage medium at start-up time. Romeas requires that the laser beam be impinged on the optical disk for calibrating the laser. It is desired to control such laser beam impingment on the optical disk for preventing any unintended erasure which is not provided by the Romeas disclosed apparatus, i.e., a digital analog converter (DAC) which controls the laser beam intensity is within the calibration loop for calibrating the laser, per se.

Yoshikawa in U.S. Pat. No. 4,858,219 shows a laser control system for an optical disk recorder for reading, writing and erasing operations. This patent shows a laser control servo for all three functions. Yoshikawa teaches the use of inhibiting means to actuate the lens focusing circuits and the lens positioning or tracking circuits to either defocus the beam or move the beam off the data area of the disk whenever an excessive beam intensity is detected. It is desired to provide a more secure overpower prevention which is operative at start-up time and which is useful with diverse types of optical media. Nakatsuyama, et al. in U.S. Pat. No. 4,656,617 shows a disk start-up control method and circuit for an optical playback system. This patent teaches loading a disk onto a disk drive motor then finding the focal position of the lens, i.e., focusing the lens, then powerfully energizing the disk drive motor for a certain period of time for starting the disk spinning and then energizing the focus and tracking servo circuits during initial rotation of the disk drive motor. In contrast, it is desired to postpone the focussing of the player optical system until after the beam of radiation from a laser is safely established.

Tominaga in U.S. Pat. No. 4,811,194 discloses an optical information processing apparatus having a scanning device for effecting recording or reproduction of information from an optical record medium. A detector detects the relative speed between the medium and the light beam provided for reading and recording. Upon detecting that the relative speed is below a predetermined value, the beam is defocussed. The defocussing limits the effect of a laser beam impingment on an optical medium by reducing power level at the medium.

Yoshikawa in U.S. Pat. No. 4,734,914 teaches the adjustment of the intensity of a laser beam of radiation when the optical system objective lens or focussing lens is held in a defocussed state.

Kusano in U.S. Pat. No. 4,835,755 shows an optical disk reproducing apparatus employing a digital servo control. Such digital servo control is used in the focusing loop, tracking loop, spindle loop, and a time base servo loop for processing in a microprocessor. The analog to signal conversion circuitry has an input/output characteristic which varies in accordance with error signal level enabling a reduction of the number of bytes in the A-D output. Two ranges of operations are provided.

Co-pending and commonly assigned patent application Ser. No. 07/555952 filed Jul. 20, 1990 shows the calibration of a digital to analog converter (DAC) before machine-operations. Note that the DAC is calibrated rather than the laser beam calibrated to the optical medium. After the DAC is calibrated, then the laser is calibrated using absolute power levels measured during the DAC calibration. Such DAC calibration is used in the present start-up procedures, as disclosed in the present application.

Japanese published unexamined Patent Application 62-57168 shows an optical disk having a plurality of patterns recorded on a disk which indicate the type of the recording to be used on a disk.

SUMMARY OF THE INVENTION

In accordance with the present invention, apparatus for operating an optical recording and reproducing device has a laser for emitting a beam of radiation and which can receive an optical record medium for signal exchanging operations to occur between the received medium and the device. The received medium can be any one of a plurality of types optical media, such as read only, magnetooptic rewriteable media, phase change media, write once ablative recordable media, and the like. Each optical medium includes an indication as to which type of optical recording is to be used. Optical means are interposed between the laser and the received record medium for controlling the laser to emit a beam of radiation suitable for recording, erasing, or reading information from the received optical medium. The receiving means of the device indicates the receipt of such optical medium. A first initialization means connected to the receiving means responds to the receipt indication for establishing an operation of the optical means for enabling sensing the medium type identification. Such establishing includes moving the lens to a most remote defocussed position for defocussing the beam of radiation with a minimal energy level per square unit on the optical medium; then calibrating the optical means laser control circuits, which may include a digital to analog converter (DAC) independently of the record medium, then the laser is actuated to emit a minimal or controlled intensity beam of radiation for enabling sensing the type identification on the received record medium and then the beam of radiation is focussed. Type identification means are connected to the first initialization means for responding to the completion of the above-mentioned operations for actuating the optical means to sense the medium type identification and then to indicate the type of received medium. Operation controlling means are connected to the type identification means and to the optical means for responding to the indicated type of received medium to establish a power control table for the optical means to control the laser during subsequent signal exchanging operations. A source of power intensity indication is provided for each of the types of optical media to be received. In one type, such as ROM, the source of laser power is from the first initialization means, for a write once read many (WORM) received record medium, the desired power intensity levels for all of the recording, erasing, and reading functions are read from the medium and then established in the power control table. In write once, the erasing only is for limited obliteration of data for security purposes. In a rewriteable medium such as magnetooptic and other types, the focus and tracking operations are calibrated followed by a recalibration of the DAC which is in turned followed by calibrating the laser emission levels.

The foregoing and other objects, features and advantages of the invention will be apparent from the following more particular description of preferred embodiments of the invention, as illustrated in the accompanying drawings.

DESCRIPTION OF THE DRAWINGS

FIG. 2 is a diagrammatic showing of an optical disk and its relationship to an optical beam as used in the FIG. 1 illustrated recorder.

FIG. 5 is a simplified block-flow diagram showing calibration of a tracking circuit.

DETAILED DESCRIPTION

Figure 1:
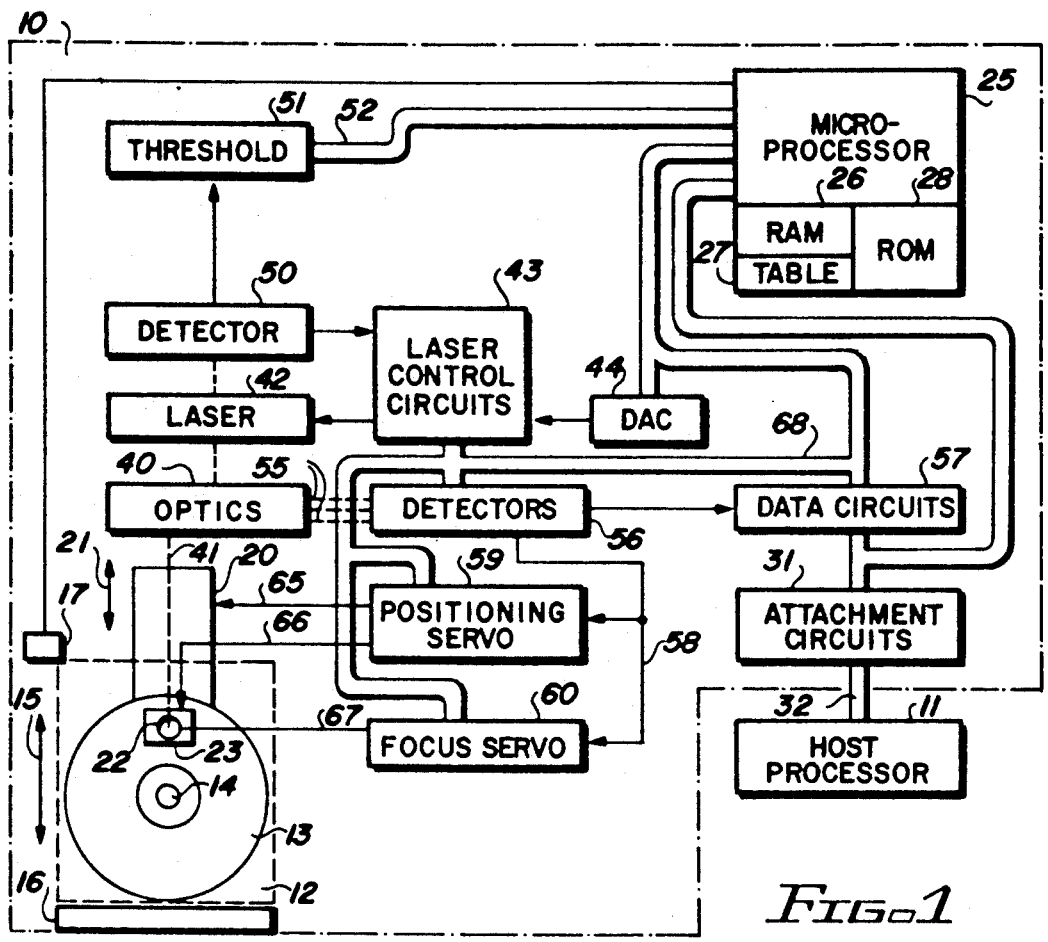
FIG. 1 is a simplified block diagram showing an optical disk recorder constructed employing the teachings of the present invention.

Referring now more particularly to the drawing, like numerals indicate like parts and structural features in the various figures. FIG. 1 illustrates an optical player 10 which is capable of recording, erasing, and sensing signals recorded on an optical disk 13. Optical player 10 is hereinafter referred to as a device. Device 10 is connected to a host processor 11 for enabling the host processor to exchange data between itself and the optical disk 13. Optical disk 13 is contained in a usual cartridge 12 which is receivable into the device 10 through a usual aperture 16. Double headed arrow 15 indicates the receipt and ejection motions of cartridge 12. When cartridge 12 is fully received into device 10, a spindle 14 of a disk rotating motor (not shown) is in operative engagement with the center hub of disk 13. The receipt of cartridge 12 actuates sensing switch 17 which indicates the receipt of an optical record medium or disk 13 into device 10.

Accessing a plurality of the usual data storage areas or sectors on disk 13 is via a headarm assembly 20 which moves radially of the received disk 13 as indicated by the double headed arrow 21. An objective lens 22 disposed on the distal end of headarm 20 directs and focuses the beam of radiation from a later described laser onto the recording surface of disk 13. U.S. Pat. No. 4,839,876, incorporated by reference, shows an alternate light path suitable to be the light path 41 between the optics 40 and optical disk 16. The well known use of a mirror to bend a light path is used in the present embodiment rather than the illustrated optics 22 of said U.S. Pat. No. 4,839,876. The illustrated disk 13 has but a single recording surface, it is within the scope of the present invention to receive one or more record media each of which can have two sided recording and hence can use two oppositely facing lenses 22. Lens 22 is mounted in fine actuator 23 which is carried on headarm 20. Fine actuator 23 is moveable radially with respect to the headarm for fine radial movements of lens 22, such as for track following of the tracks on disk 13 and for radial movements of a small number of tracks without causing the headarm 20 to move. Actually, in the servo system of the FIG. 1 illustrated device fine actuator 23 controls the position of the beam on disk 13 through focusing the lens 22 and the radial movement of the lens. Headarm 20 is servo driven to always follow the motions of the fine actuator 23.

Figure 3:
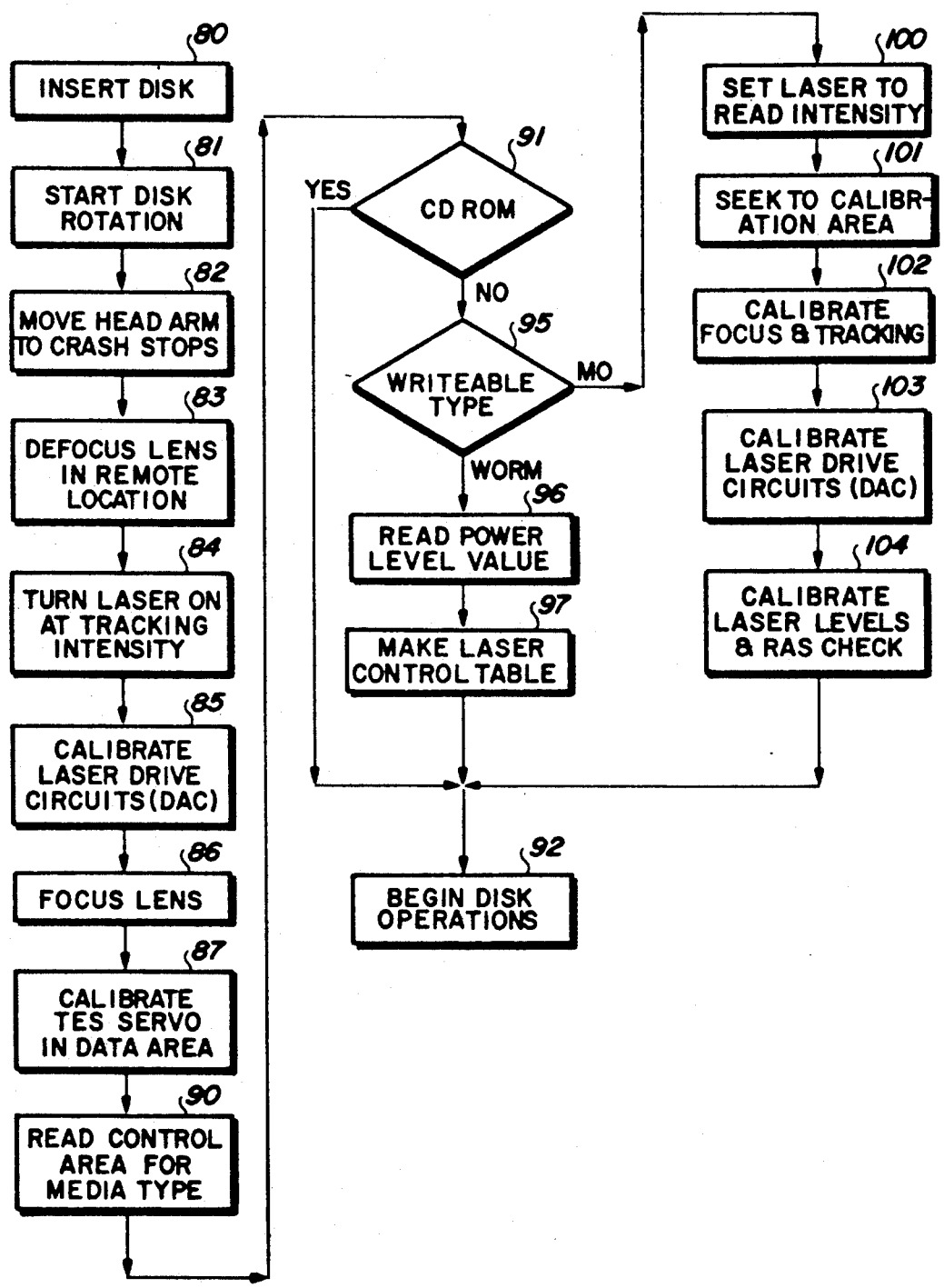
FIG. 3 is a simplified flow chart of machine operations of the FIG. 1 illustrated machine in an early embodiment of the present invention.

Device 10 is controlled by a microprocessor 25 which receives the switch 17 receipt indication. Random access memory (RAM) 26 stores control information including a power control table 27. Power control table 27 enables intensity control of the laser of device 10 as later described with respect to FIG. 3. Read only memory (ROM) 28 stores the microcode which is executed by microprocessor 25 for controlling the operation of device 10. The later described FIG. 3 illustrated machine operations are controlled by microprocessor 25 including the microcode.

Microprocessor 25 communicates with host processor 11 for receiving host processor commands and supplying sense information to the host processor via attachment circuits 31. A bus 30 connects microprocessor 25 to attachment circuits 31 while a channel connection 32 connects attachment circuits 31 to host processor 11. Such connections are in a usual manner.

Device 10 communicates with the optical disk 13 through optic system 40 which includes the usual beam splitters and the like. A light path 41 extends from optics 40 over headarm 20 to be reflected by a mirror (not shown) through lens 22 to the recording surface of disk 13. Light reflected from disk 13 also traverses light path 41 to optics 40. The light path between disk and optics 40 is also shown in the document incorporated by reference. A laser 42 emits a front beam to optics 40 which is processed to light path 41. Laser control circuits 43 control the intensity of the beam of radiation emitted by laser 42 to optics 40. For minimal intensity beams such as used when not recording or erasing on disk 13, a servo control loop (not shown) is used to control the intensity, such as when reading signals recorded on disk 13. For recording (writing) and erasing, DAC 44 is set to a predetermined value by microprocessor 25 by signals supplied over bus 45 to actuate laser control circuits 43 to drive laser 42 to emit a corresponding intensity beam of radiation. DAC 44 is calibrated before any operations such as sensing, erasing and writing occur. For the recording and erasing operations, no servo loop is used.

Over power detection and calibration of DAC 44 and laser 42 achieved by detector 50 receiving the back beam of laser 42. The detected intensity of the back beam is supplied by detector 50 to laser control circuits 43 for use in the servo circuits which control the laser 42 during sensing or reading operations and for minimal emission of radiation. Threshold circuits 51 also receive the detector 50 electrical indication of the laser 42 emitted beam of radiation. Threshold circuits 51 are used in calibrating the DAC 44 by comparing the indicated emission of radiation with reference values as the input values to DAC 44 are changed. Threshold circuits 51 also detect over power by comparing the indicated intensity of a radiation with other threshold values built into threshold circuits 51. The results of the comparison of the electric indication of the intensity of beam of radiation is supplied over bus 52 to microprocessor 25 for processing. In response to an over power detection, microprocessor 25 actuates laser control circuits 43 via DAC 44 to turn the laser 42 off. During DAC calibration, microprocessor 25 sends a predetermined calibration sequence of values to DAC 44 for adjusting the operation of laser 42.

Reading recorded signals from disk 13 includes optics 40 supplying two of the plural light beams 55 to detectors 56 corresponding to the P&S components of a magnetooptic disk 13 signal. For intensity modulated sensing, such as used in an ablatively recorded WORM disk, phase change disk, or molded ROM disk detector 56 operation is changed as later described with respect to FIG. 4 for detecting the data. Data circuits 57 process the detected data, including error detection and correction, reformatting, decoding and the like. During a read operation after microprocessor 25 has set up the device 10 for reading, data circuits 57 supply the detected and corrected data through attachment circuits 31 to host processor 11. During recording operations, after microprocessor 25 has set up the device 10 for recording, host processor 11 supplies the data signals to be recorded through attachment circuits 31 thence to data circuits 57. During recording, data circuits 57 supply data over bus 45 to laser control circuits 43 for modulating laser 42. Data circuits 57 preferably have a buffer for storing a predetermined amount of data for recording one sector of disk 13.

The positioning of lens 22 for causing a beam of radiation to impinge upon different areas of disk 13 is controlled by positioning servo 59 under control of microprocessor 25, indicating which track is to be scanned. Positioning servo 59 has two portions, one for controlling the headarm 20 as indicated by line 65. Line 65 goes to an actuator coil (not shown) of headarm 20 for causing it to position the headarm to follow the motions of lens 22. The control of fine actuator 23 radial position is effected through a signal supplied by positioning servo circuits 59 over line 66. Track following is effected by a servo loop which includes optics 40 supplying one of the beams 55 to a detector (not shown) in detector 56 which generates a position error signal supplied over line 58 to positioning servo 59. Similarly, focus servo 60 is controlled by microprocessor 25 for moving the lens 22 toward and away from the recording surface of disk 13 by a control signal supplied over line 67 to an actuator coil (not shown) associated with lens 22. The position detector (not separately shown) in detectors 56 also detects focus error signals and supplies same over a separate line in line 58 to focus servo 60.

The operation of the present invention are best understood by referring next to FIG. 2 wherein the spatial relationship between headarm 20 and disk 13 is illustrated. For an initial calibration of DAC 44 and laser 42, headarm 20 is commanded to move to an extreme radial position, such as against the crash stops 75. In one embodiment of the invention, moving the headarm 20 against crash stop 75 moves the lens 22 to an inwardly most reachable radial position disk 13. In some disks, this radially inward most position such as in band 70 is a non-data area. On other disks, area 70 may contain data, therefore, for device 10 to operate with both types of disks the procedures of FIG. 3 have to be followed to ensure against inadvertent erasure of any signals recorded in area 70. Each of the record disks 13 to be received into device 10 will have a control track 71 either on a radially inward portion or a radially outward portion. Within control track 71 are recorded the type identification in a so-called phase encoded portion (PEP) which is self clocking and, therefore, is readable as each device 10 knows that phase encoding is used. Headarm 20 is moveable to a radially outward most position as indicated by dashed line 77 for positioning the beam of radiation at position 79. Between control track 71 and an additional control track or warning area 73 is the data recording area 72. Part of the calibration of initializing device 10 to a just received disk 13 includes calibration techniques over data storing area 72.

The FIG. 3 flow chart of machine operations illustrate a practice of the present invention. At machine step 80 the inserted disk 13 is sensed by switch 17 which indicates the receipt of a new disk 13 to microprocessor 25. Microprocessor 25 then actuates spindle motor rotation through a motor (not shown) at machine step 81. Simultaneously therewith, at machine step 82 microprocessor 25 actuates the headarm 20 to move to crash stops 75 for positioning lens 22 over area 70 of disk 13. Simultaneously to steps 81 and 82, at step 83 microprocessor 25 actuates focus servo 60 to move the lens 22 to a most remote position from the recording surface of disk 13. As soon as the disk 13 is rotating at a predetermined speed, microprocessor 25 commands laser control circuits 43 to actuate laser 42 to emit a beam of radiation at a minimal or safe intensity level, herein referred to as a tracking intensity. Such tracking intensity when the beam of radiation when impinging upon any of the disk 13 of any type is insufficient to erase or any way alter any recorded information on disk 13.

After disk 13 has reached a predetermined rotational speed, which may be less than the operating speed of the disk 13, laser circuits 43 and DAC 44 are calibrated using a calibration loop of laser 42, detector 50, threshold circuits 51, microprocessor 25, DAC 44 and the laser control circuits 43. This calibration determines digital values to be input to DAC 44 for effecting a predetermined intensity of a front beam emitted by laser 42 to optics 40. That is, the intensity of the emitted beam of laser 42 is measured for calibrating DAC 44 operations. Upon a successful completion of the calibration, then device 10 knows the intensity of the beam of radiation emitted by laser 42 which permits microprocessor 25 to command focus servo 60 to focus the lens at machine step 86. It should be noted that steps 82 through 86 can be effected over a data recorded area of disk 13 without disturbing the recorded data.

The positioning servo 59 is to be calibrated at step 87 which calibrates the tracking error signal (TES) as shown in FIG. 5. This calibration is achieved over data area 72 by radially scanning a large plurality of tracks, such as several hundred. In this regard it is noted that the disk 13 is of the grooved type, having either a single spiral radial groove or a plurality of concentric grooves. As the beam of radiation focussed by lens 22 is moved radially of disk 13 the reflected beam along path 41 has a sine wave intensity variation. Such sine wave intensity variation is called tracking error signal TES. A zero axis crossing of the tracking error signal indicates a track position or center line while a second zero axis crossing (opposite direction of crossing) indicates a midpoint between two adjacent tracks. After calibrating TES, at machine step 90 the type identification recorded in control track 71 is read for determining the media type. This information is detected by detector 56 using the circuit of FIG. 4. Data circuits 57 detect and supply the information to microprocessor 25. Microprocessor 25 at machine steps 91 and 95 analyzes the type identification and uses same for determining the source of information for controlling laser 42 and ensuing operations. At machine step 91 if a ROM (Read Only Memory) disk has been inserted, then the laser intensity calibration effected in steps 82–86 are used for reading the CD ROM disk 13 for immediately beginning the disk operations 92. If at machine step 91 it is determined that a writable disk 13 has been inserted, then at machine step 95 the type of writeable recording to be used is detected. For a write once read many (WORM) recorded disk, the power level for operating a device with the disk has been recorded on the disk 13. Such recording is a standard practice in the industry, therefore, at machine step 96 that recorded power level in a control track 71 is read as the beam intensity source for controlling laser 42. A laser control table 27 is constructed at machine step 97 based upon the DAC calibration in step 85 then disk operations 92 ensue. A WORM disk 13 may also be a phase change disk. In such instance, either the steps 96 and 97 may be employed, or if the phase change disk does not have power level recording, then the additional calibration steps for magnetooptic type disks may be employed. If at machine step 95 a magnetooptic (MO) disk 13 has been indicated, then at machine step 100 microprocessor 25 actuates laser control circuits 43 to actuate laser 42 to emit a beam of radiation at the read intensity level. Such read intensity level is predetermined and a fixed value. Then at machine step 101, microprocessor 25 actuates headarm 20 to move to a calibration area of disk 13 for calibrating focus and tracking and the DAC 44. Such calibration area is included within the control track 71 either as separate tracks or the portion of the track. Once the lens 22 is over the calibration area, then at machine step 102 the focus and tracking servos 59 and 60 are calibrated. The focus circuits are calibrated to best focus and the tracking circuits are calibrated for preciously indicating the center of a track. Then at machine step 103 laser drive circuits DAC 44 are calibrated. Such recalibration ensures that the preciousness of the intensity of the laser 42 beam of radiation during ensuing disk operations 92. After DAC 44 is calibrated as above described the laser 42 levels are calibrated, i.e., table 27 is generated. Also included in step 44 are reliability, availability, and serviceability (RAS) checks to ensure proper operation of the FIG. 1 illustrated device 10. Then disk operations 92 then ensue.

Figure 4:
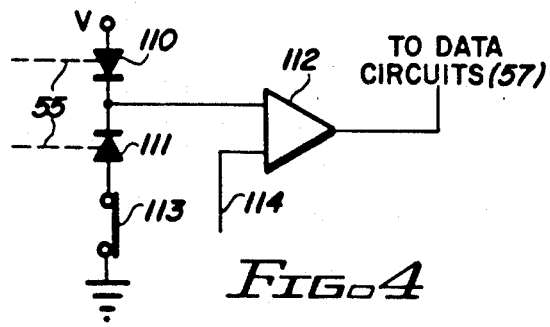
FIG. 4 is a simplified circuit diagram showing an electrical circuit for detecting both magnetooptic modulated signals and intensity modulated signals as may be received from a received optical medium.

Data detector of detector 56 is shown in simplified form in FIG. 4. Two of the beams 55 from optics 40 carry the magnetooptic information in P&S components. A pair of photodetectors 110 and 111 are cascode connected between a voltage V and ground reference potential. The difference in voltage between the photodetectors 110 and 111 is supplied to an amplifier 112 which has a separate threshold input 114. Amplifier 112 output goes to data circuits 57. When the FIG. 4 illustrated circuit is to be used for detecting data sensed from a ROM, ablatively recorded disk or a phase change disk, then switch 113 is opened such that only photodetector 110 is operative to supply signals to amplifier 112. Most of the disk 13 reflected light is in the light component impinging upon diode 110.

The calibration of servo positioning circuits 59 which control the fine actuator 23 radial position is shown in FIG. 5. The TES supplied over line 58 goes to the positioning circuits 59 for controlling operation during a seek mode, i.e., when positioning servo 59 is moving lens 22 radially across many of the grooved tracks in disk 13. Differentiating circuit DIFF 120 receives TES for differentiating same. It should be noted that the differentiated signal has its maximal amplitude corresponds to the zero axis crossing of TES for indicating the center of a track or the midpoint between two tracks. It is desired to calibrate the servo control for ensuring that the zero axis crossing of TES does in fact indicate the center of a groove or track. Accordingly, circuit 121 measures the peak amplitudes of each cycle of the differentiated TES and supplies a digitized version to microprocessor 25. Microprocessor 25 supplies offset values to register 122 for modifying the servo 59 operation. Register 122 in turn supplies the offset values to DAC 123 which in turn supplies the offset control signal to servo 59. Microprocessor 25 varies the offset values such that the measured amplitude in circuit 121 will vary. A large number of samples are taken for measuring the variations around the circumference of the disk as well as radially. Upon completion of all the measurements, a mean value is calculated by microprocessor 25 and that value is used to supply to register 122 for controlling the offset of servo 59 operations during ensuing operations 92.

Figure 6:
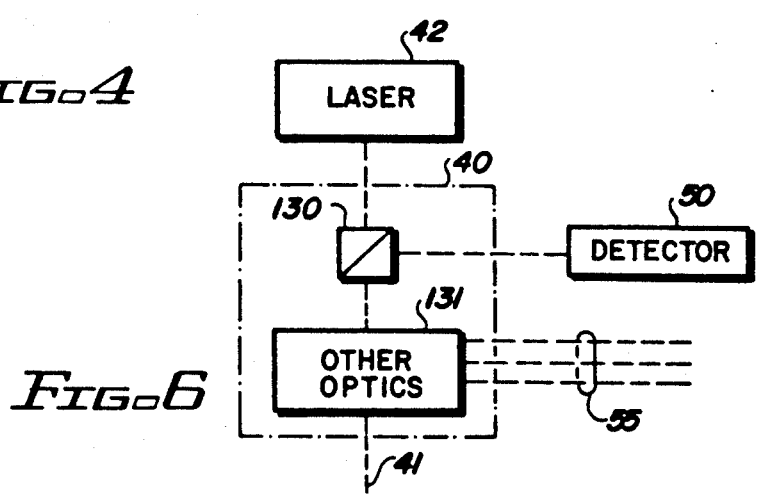
FIG. 6 is a simplified circuit diagram illustrating an alternative embodiment.

FIG. 6 shows an alternate arrangement for obtaining laser beam intensity signals. Detector 50 rather than being optically coupled to the rear port of laser 42 as seen in FIG. 1, it is optically coupled to optics 40 for receiving a portion of the beam emitted by laser 42 through its front port. A beam splitter 130 in optics 40 directs a portion of the laser 42 beam to detector 50.

The remainder of the beam is directed to other optics 131 which contains all of the usual optical elements in an optical disk drive. Other optics 132 direct a portion of the laser beam to path 41. All of the remaining portions in FIG. 1 remain as shown.

While the invention has been particularly shown and described with reference to preferred embodiments thereof, it will be understood by those skilled in the art that various changes in form and details may be made therein without departing from the spirit and scope of the invention:

What is claimed is:

1. In apparatus of the optical type operative with any one of a plurality of types of optical media, each medium having machine sensible indicia indicating the type of medium, the device having optical means mounted for relative movement with the medium for enabling access to any one of a multiplicity of addressable data storage areas on the medium and a laser in the optical means for supplying a focusable beam of radiation to the medium for effecting an exchange of signals between the medium and the device, including, in combination:

means for receiving an optical medium to be positioned in a play position in the device including means for detecting and indicating receipt of an optical medium of unknown type;

initialization starting means connected to the receiving means for responding to the indication to relatively move the medium and the optical means in the transverse direction to the first extreme position and for defocussing the optical means such that the beam of radiation is defocussed at the medium;

laser calibration means connected to the starting means for actuating the laser to first emit a beam of radiation having a first predetermined intensity less than an intensity for modifying the signals on any of said optical media and for calibrating the optical means operation of the laser to establish predetermined laser drive signals for effecting measured intensities of beam radiation;

servo control means having calibration means connected to the laser calibration means for responding to said calibration of the optical means to actuate the optical means to focus the beam of radiation on the medium;

type identification means connected to the servo control means for responding to the focussing of said beam of radiation to actuate the optical means to sense the medium type indicia on the medium received by the receiving means and for indicating the type of the received medium;

operation initiation means connected to the type identification means for responding to the sensed indicia indication of a ROM medium type to begin medium signal exchanging operations without further calibrations using a current laser power and to a sensed indicia indication of a writable medium type to establish laser power control table for sensing and writing intensities for the beam of radiation and then beginning signal exchanging operations using the power control table for establishing intensities of the beam of operation.

2. In the apparatus set forth in claim 1 further including, in combination:

writable medium initiation means in the operation initiation means for responding to the indicia indication of a writable received medium to ascertain the type of received writable medium, when ascertaining that the received writable medium is of a rewritable type, then calibrating the optical system focussing of the beam of radiation, the relative movement between the medium and the optical means and the optical means operation of the laser and establishing in the power control table values or laser operation for recording and erasing operations of the device on the received medium and then beginning signal exchanging operations between the device and the received medium, and when ascertaining that the received writable medium is a write once medium establishing values in the power control table for operation of the laser for writing onto the write once medium.

3. In apparatus for operating an optical device having a laser for emitting a beam of radiation and for receiving an optical record medium with which signal exchanging is to occur between a received medium and the device wherein the received medium can be any one of a plurality of types of optical media and includes a machine sensible identification of the media type, optical means for receiving the laser beam of radiation for focussing and directing the beam to a received record medium and for controlling the laser to emit a beam of radiation having selected intensities such that a received record medium can selectively sensed, written to or erased, including, in combination:

receiving means for receiving a record medium and indicating receipt of such record medium;

first initialization means connected to the receiving means for responding to the receipt indication for establishing an operation of the optical means for enabling sensing of the medium type identification, said establishing including defocussing the beam of radiation, calibrating the optical means laser control independently of the record medium, actuating the laser to emit a minimal intensity beam of radiation to enable sensing the type identification, then focussing the beam of radiation;

type identification means connected to the first initialization means for actuating the optical means to sense the medium type identification and indicate the type of the received medium;

operation controlling means connected to the type identification means and to the optical means for responding to the indicated type of received medium to establish a power control table for the optical means to control the laser during signal exchanging operations; and a plurality of sources of laser power intensity indications connected to the operation controlling means, said operation controlling means selecting one of said sources of laser power indications for use with the received medium that matches the sensed type identification and actuating the optical means to control the laser using the selected source.

4. In the apparatus set forth in claim 3 further including, in combination:

said initialization starting means including means for moving the lens to a most remote defocus position with respect to the received record medium.

5. In the apparatus set forth in claim 4 further including, in combination:

said operation initiation means including WORM means responding to a WORM writable medium being indicated to sense a recorded power level indicated on the received record medium and to set the table values based on the indicated power level and then beginning signal exchanging operations; and MO means responding to an MO type record medium being received to calibrate the optical means operation of the laser for setting the table values of laser power drive and then beginning signal exchanging operations.

6. In apparatus for operating an optical device which has a laser in a focusable optical means for supplying a beam of radiation to and for sensing signals recorded on an optical record member, including, in combination:

initializing means for actuating the optical means to be defocussed with a minimum power laser impingement level on the record member and for calibrating the optical means laser to operate at a first low power level while the optical means is defocussed; and operations preparing means connected to the optical means and being responsive to the initializing means to calibrate the focus of the optical means such that the beam of radiation is focussed at the optical record member and thereafter calibrating the optical means laser to operate at a second power level with the beam of radiation being in focus, said second power level being a power level to be used for exchanging data signals between said optical record member and said optical device.

7. In the apparatus set forth in claim 6 further including, in combination:

said optical means including positioning means connected to the optical record member for relatively positioning the beam of radiation and the optical record member by relatively moving a part of the optical means and the optical record member such that the beam of radiation impinges on diverse record storing areas of the optical record member; and said operation preparing means including positioning-means-calibrating means for calibrating the position means operation for controlling said relative movements, said operation preparing means actuating said positioning-means-calibrating means to calibrate said positioning means before said calibration of the optical means laser by said operation preparing means.

8. In a machine-effected method of initializing an optical device or operation with an optical member, the member having machine-sensible indicia for indicating that the type of recording medium in said optical member is read-only or writable, the device having a laser which emits a beam of radiation to the optical member for performing predetermined operations on the optical member, a calibratable signal drive means connected to the laser for controlling the laser for determining the intensity of the beam of radiation, a calibratable focussing mechanism and a relative positioning means which controls a relative position of the optical member with respect to the beam of radiation including the machine-executed steps of:

defocussing the focussing mechanism so that a reduced intensity per unit area of the beam of radiation impinges on the record member;

calibrating the signal drive means so that the signal drive means can control the laser to emit a predetermined beam intensity;

actuating the focussing mechanism to focus the beam of radiation at the optical member;

performing a preliminary read optical operation on the optical member including reading said machine-sensible indicia for determining and indicating the read results as indicative of read-only or writable optical parameters of the optical member;

detecting that the indicated parameters meet a first criterion of read-only characteristics, then focussing the laser beam on the member for performing signal reading optical operations on the optical member; and detecting that the indicated parameters meet a second criterion of a writable medium, then focussing the beam of radiation on the optical member, then calibrating the signal drive means operation using the focussed laser beam to the optical member and then performing signal exchanging operations including writing signals onto the optical member.

9. In the machine-effected method set forth in claim 8 wherein the optical member being an optical disk with a recording area extending radially of the disk between inner and outer extreme radial positions, further including the machine-executed steps of:

before doing said defocussing step, relatively moving the beam of radiation and the optical member to a one of said extreme radial positions; and after calibrating the signal drive means and before doing said preliminary optical operation, actuating the focussing mechanism to focus the beam of radiation at the optical member.

10. In the machine-effected method set forth in claim 9 wherein the optical member contains machine sensible indicia indicating predetermined parameters of the optical member and further including the machine-executed steps of:

in said preliminary optical operation sensing the machine-sensible indicia and indicating the sensed indications of the parameters;

establishing said first criterion as indicating a read only optical member; and establishing said second criterion as indicating a writable optical member.

11. In the machine-effected method set forth in claim 10 further including the machine-executed steps of:

making the relative positioning means a calibratable relative positioning means; and each time the focussing mechanism is focussed, calibrating the relative positioning means.

12. In the machine-effected method set forth in claim 11 further including the machine-executed steps of:

selecting said signal drive means to include a digital to analog converter DAC having a plurality of settings, each setting resulting in a different drive signal amplitude for the laser; and when calibrating the signal drive means, establishing known power drive thresholds and calibrating the DAC to supply a drive signal for the laser which produces a predetermined power level at each DAC setting for actuating the laser to output a predetermined intensity beam of radiation having a predetermined power drive signal amplitude related to said threshold and thereafter establishing a table of laser drive values as respective DAC settings.

13. In the machine-effected method set forth in claim 8 further including the machine-executed steps of:

establishing that the first criterion indicates a first type of writable optical member and before continuing said optical operations, establishing laser drive signal values for the laser to operate with the first type of writable optical member; and
establishing that the second criterion indicates a second type of writable optical member which includes rewriting previously written to areas of the optical member.

* * * * *